United States Patent [19]

Whatley

[11] Patent Number: 4,706,858

[45] Date of Patent: Nov. 17, 1987

[54] HUNTING DEVICE

[76] Inventor: William G. Whatley, Rte. 1, Akron, Ala. 35441

[21] Appl. No.: 908,772

[22] Filed: Sep. 18, 1986

[51] Int. Cl.⁴ .............................................. A45F 3/14
[52] U.S. Cl. .......................................... 224/184; 2/94
[58] Field of Search ....................... 224/184, 202, 259; 2/94

[56] References Cited

U.S. PATENT DOCUMENTS

| | | | |
|---|---|---|---|
| 1,736,131 | 11/1929 | Reece et al. | 224/202 |
| 2,142,887 | 1/1939 | Dixon | 224/259 |
| 2,620,479 | 12/1952 | Buck | 224/202 X |
| 2,931,629 | 4/1960 | Keller | 224/184 X |
| 3,074,074 | 1/1963 | Lovering | 224/184 X |
| 4,396,091 | 8/1983 | Anderson | 224/184 X |
| 4,397,500 | 8/1983 | Moffit | 224/184 X |
| 4,601,067 | 7/1986 | Buonassissi | 224/94 X |

Primary Examiner—Henry J. Recla
Assistant Examiner—Robert M. Petrik
Attorney, Agent, or Firm—Nies, Webner, Kurz & Bergert

[57] ABSTRACT

An improved hunting device for use as a jacket and to assist in hauling game from the woods is disclosed. The device of the present invention is constructed by measuring and cutting a rectangular piece of carpet or other flexible, foldable material. The material is sized to fit the upper body down to waist level and an opening is cut in the center of the material to receive the head of the hunter. A length of rope is attached to one of the short sides of the rectangular material adjacent both outer ends thereof and the rope then extends on the underside of the material adjacent both long sides of the material along the length thereof. The rope then passes through a hole adjacent each outer end of the other short side of the material to the outside of the material and a securing hook is attached to each of the two ends of the rope. In use, the hunter passes his arms between the rope and material on each long side thereof and inserts his head through the center opening. The lower front and rear portions of the material may then be drawn together to provide a jacket-like appearance. The hooks at the ends of the rope may be attached to a game animal to be hauled from the woods. The particular construction of the hunting jacket with the ropes positioned at waist level allows the body strength of the hunter to be used, rather than the hands and arms, and with the hands being left free to carry guns and other equipment.

9 Claims, 5 Drawing Figures

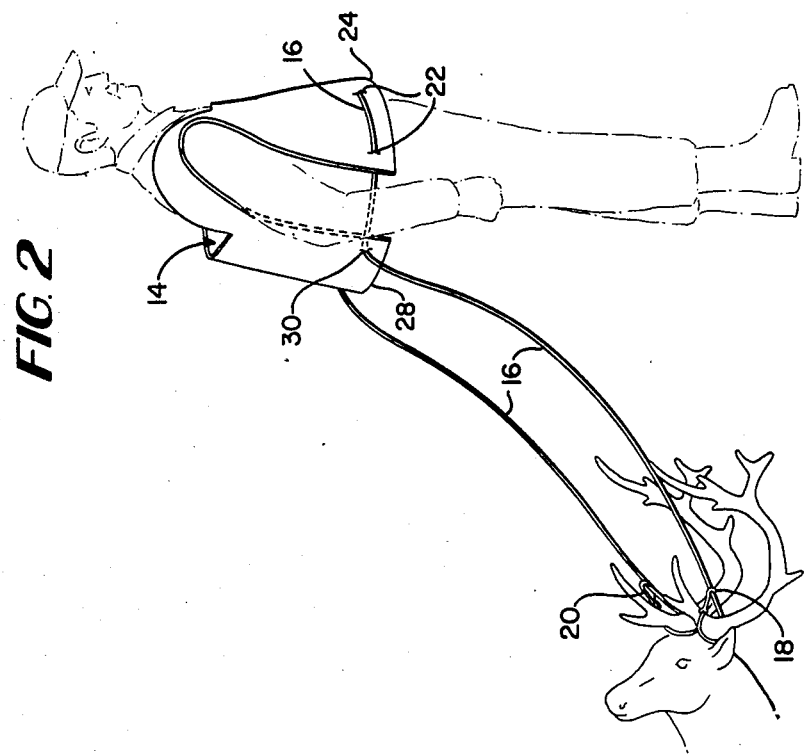
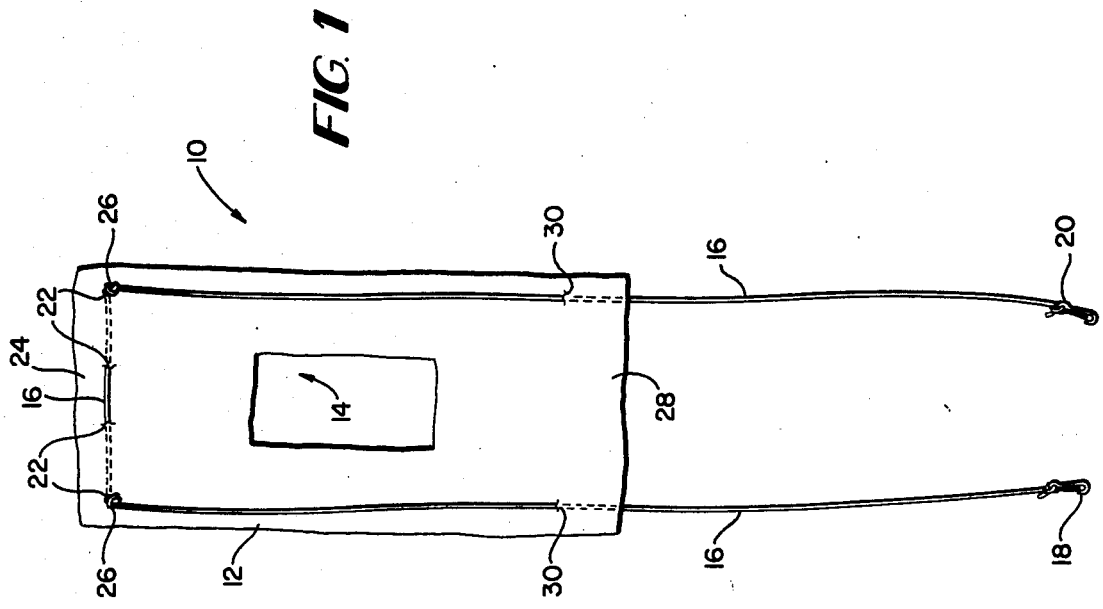

HUNTING DEVICE

BACKGROUND AND SUMMARY OF THE INVENTION

The present invention relates to a hunting device in the form of a hunting jacket. More particularly, the present invention relates to a device which can be used as an article of clothing in the form of a jacket for warmth, and which can be folded and used to sit on and with a further primary purpose of assisting the hunter in hauling his game from the woods with less effort. The device has been named the "EZ Game Tow", to signify the usefulness of the device of the present invention.

Previous devices having characteristics for use as a hunting jacket or for towing game and other objects are described in the following U.S. Pat. Nos.: 2,996,228 to Bauman; 3,074,074 to Lovering; 3,077,292 to Gehrke; 3,346,154 to Bishop; and 4,431,121 to Bensette.

By the present invention, there is provided an improved hunting device for use as a jacket and to assist in hauling game from the woods. The device of the present invention is constructed by measuring and cutting a rectangular piece of carpet or other flexible, foldable material with the thickness of the material determining the warmth of the jacket. The material is sized to fit the upper part of the body to the waist, and an opening is cut in the center portion of the material to receive the head of the person using the device. Small holes are then cut in the lower front and back of the jacket and a length of rope or other cord-like material is run through the holes and attached to a hook at each end.

In use, the device may be used by looping the rope around the horns or body of a deer or other game animal. In this manner the body strength of the person wearing the jacket is used, rather than the hands and arms, in hauling the game through the woods. Such action also leaves the hands free to carry guns and other equipment. The jacket may be sprayed on the exterior with Hunter's Orange paint to provide protection while hunting.

BRIEF DESCRIPTION OF THE DRAWINGS

FIG. 1 is a top plan view of the hunting device of the invention in its unfolded form.

FIG. 2 shows a side elevation of the hunting device of FIG. 1 as worn by a user of the device.

DESCRIPTION OF THE PREFERRED EMBODIMENTS

Figure 3:
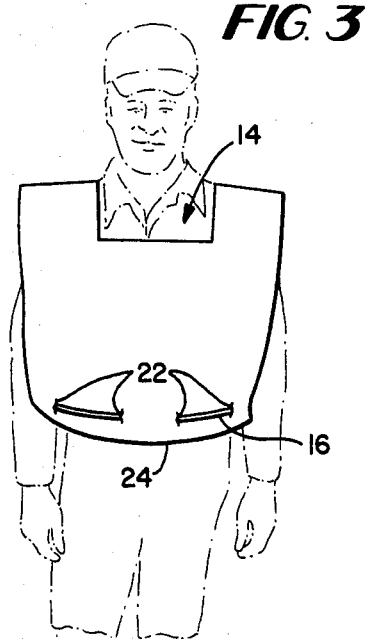
FIG. 3 is a front view of the device shown in FIG. 2.
Figure 4:
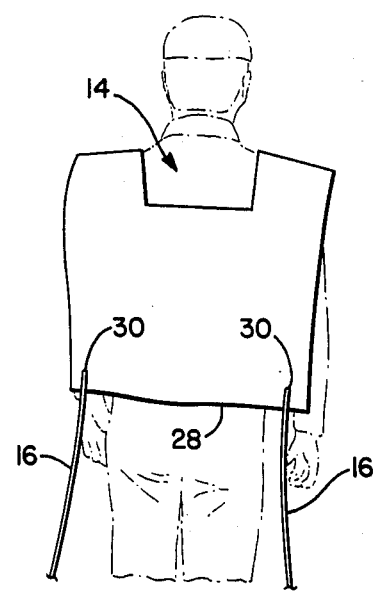
FIG. 4 is a back view of the device shown in FIG. 2.

In the embodiments of the invention as shown in FIGS. 1 through 5, the hunting device 10 of the present invention includes a piece of material 12 in the general shape of a rectangle and with an opening 14 cut in the center portion thereof to receive the head of the user of the device. The opening 14 may also be in the general shape of a rectangle and is of a size sufficient to allow the device 10 to be easily passed over the head and to provide freedom of movement of the head and neck when wearing the device 10. The width of the material 12 should also be sufficient to allow an ample portion of material 12 to extend across the shoulders of the hunter, as shown in FIGS. 3 and 4, so as not to bind the shoulders when hauling a heavy load. A length of rope 16 is passed along the periphery of the material 12 on each side and outwardly therefrom and a hook 18, 20 is attached at each end of the rope 16, as shown in FIG. 1.

In securing the rope 16 to the material 12, two or more small holes 22 are provided along the lower front edge 24 of the material 12 and the rope 16 is looped through from the underside of the material to the outerside and then back to the underside. Preferably, four holes 22 are provided at equal intervals along the front edge 24 and the rope 16 is passed from the under to the outer side and back again to the underside twice as shown in FIG. 1. A knot 26 may be formed in the rope 16 at the point where the rope 16 exits from each hole 22 at the outer ends of the material 12 adjacent edge 24. The knots 26 are preferably formed after two equal lengths of rope 16 have been laid out so as to extend an equal distance from the lower edge 28 of the material 12 as shown in FIG. 1.

The rope ends then pass rearwardly along the material 12 and exit from the underside to the outerside of the material 12 adjacent the lower rear edge 28 of the material 12 through respective small holes 30 at the outer ends of the material 12 adjacent edge 28.

In use, the person using the device 10 inserts the head through the opening 14 and the material 12 is folded down over the front and back to provide a jacket-like appearance as shown in FIGS. 2 through 5. In so doing, the arms are passed between the material 12 and the rope 16 which lies along the length of the material 12 on each side. The front 24 and rear 28 edges of the material 12 are then snugged or drawn together as shown in FIG. 2. The portion of the ropes 16 which trails from the rear edge 28 of the material 12 may be coiled or wound when not in use and inserted in the pants pocket or clipped to the jacket 10 by the use of the hooks 18, 20. The hooks 18, 20 may be of a quick release, spring biased type of conventional construction.

Figure 5:
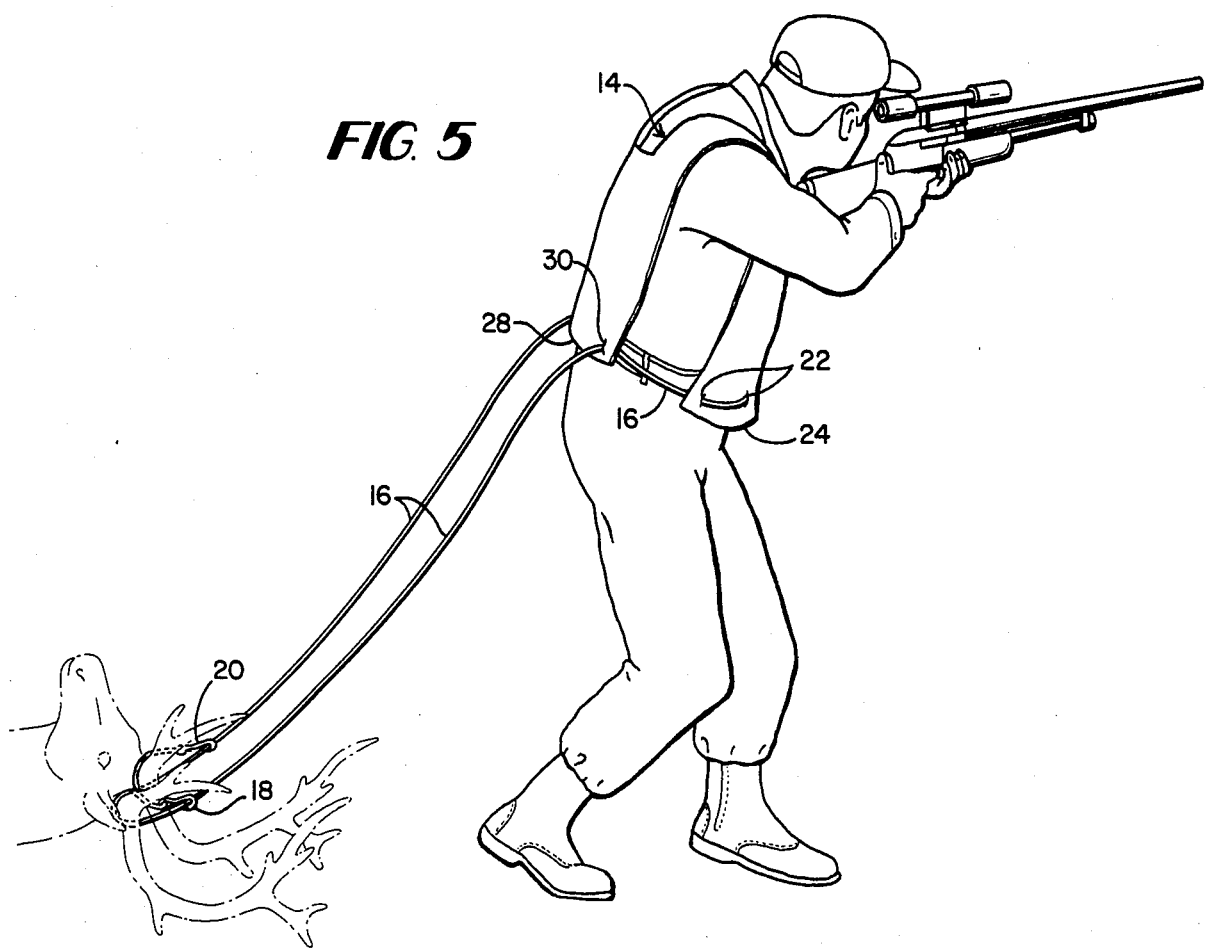
FIG. 5 is a perspective view of the hunting device of FIG. 1 as worn by a user of the device.

When it is desired to utilize the jacket 10 to haul game from the woods, the coiled rope lengths are unwound and secured around the antlers or other part of the body of the game animal as shown in FIGS. 2 and 5. The particular arrangement of the ropes 16 and jacket material 12, with the ropes 16 extending rearwardly at waist level, and with the ropes extending along the periphery of the material 12 adjacent the edges thereof, has been found to be of distinct advantage in providing additional leverage and allowing the forces exerted by the wearer of the jacket 10 to be evenly distributed over the upper body, reducing the effort required to haul heavy game through the woods under the adverse conditions frequently encountered while hunting.

The unique construction of the present device 10 is easily adapted to hunters of various sizes and the size of the material 12 to be cut can be varied in either the length or width to accommodate the size of the individual hunter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A hunting device for use as an article of clothing for the upper body and having utility for use by a hunter in towing game from the woods, comprising:
   a sheet of flexible material in planar form with two opposing surfaces and having the general shape of a rectangle with two opposing short sides and two opposing long sides, said sheet material having an opening in the center portion thereof for insertion of the head and neck of the hunter;
   a length of rope or other cord-like material, said rope being secured along one surface adjacent one short side of said sheet material including both ends of said one short side and extending from both said ends along each long side of said rectangular sheet material on the same surface of said sheet material, said rope having no fixed attachment to said sheet material along said long sides of said sheet material, said rope passing through said sheet material from one surface to the other of said sheet material adjacent each end of the other short side of said sheet material so that one end of said rope extends outwardly from each end of said other short side, said rope and sheet material thus allowing the arms of the hunter to be easily passed between the rope and the sheet material adjacent each long side of said sheet material and allowing said opposing short sides of said sheet material to be drawn together at approximately the waist level of the hunter to provide a jacket or vest-type article of clothing in which the rope extends outwardly from the waist level of the hunter.

2. The hunting device of claim 1 wherein said length of rope is in the form of one continuous piece of rope of a fixed length, said rope extending along both opposing long sides and said one short side of said sheet material.

3. The hunting device of claim 2 wherein a knot is provided in said rope adjacent each outer end of said one short side of said sheet material.

4. The hunting device of claim 1 wherein said rope passes from the under to the outer side and back again to the under side twice along the length of said one short side of said sheet material to which said rope is secured.

5. The hunting device of claim 4 wherein a knot is provided in said rope adjacent each outer end of said one short side of said sheet material to which said rope is secured.

6. The hunting device of claim 1 wherein the length of said short sides of said sheet material is sufficient to allow an ample portion of sheet material to extend across the shoulders of the hunter so as not to bind the shoulders when hauling a heavy load.

7. The hunting device of claim 1 wherein said sheet material is in the form of carpet type material.

8. The hunting device of claim 1 further including securing hook means attached to at least one end of said rope.

9. A hunting device for use as an article of clothing for the upper body and having utility in towing a heavy object comprising: a garment formed of a sheet of flexible material in planar form and having opposing surfaces in the general shape of a rectangle with opposing first and second short sides and two opposing long sides, said sheet material having an opening in the center portion thereof for insertion of the head and neck of the wearer; said garment when worn, including a back and front and defining an opening along each long side for the arms of the hunter and a tow line including a pair of end sections extending from an intermediate section, each end section being attached adjacent a respective end of the first short side of said sheet material and extending from said first short side across one of said side arm openings and through said sheet material adjacent a respective end of the second short side of said sheet material, said pair of tow line sections having no fixed attachment to said sheet material other than attachment adjacent said first short side of said sheet material.

* * * * *